Jan. 26, 1965
J. M. CARTER
3,166,913
METHOD FOR REFRIGERATING
Filed July 30, 1962
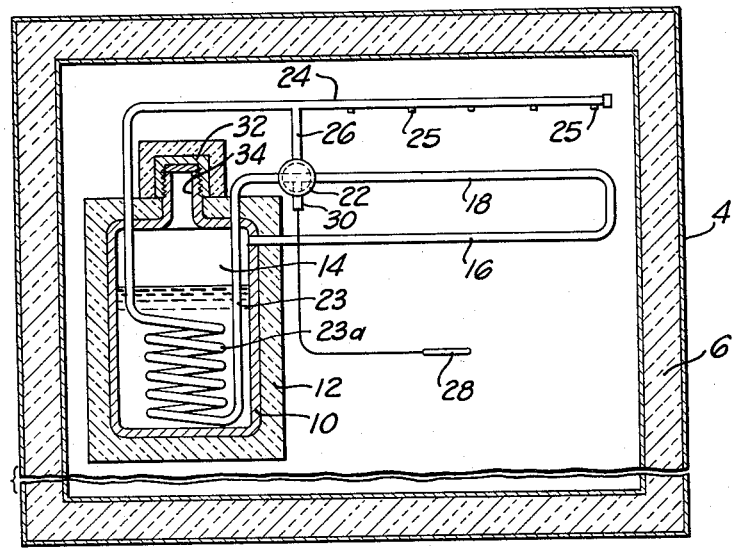
INVENTOR.
JAMES M. CARTER
BY HIS ATTORNEYS
HARRIS, KIECH, RUSSELL & KERN

United States Patent Office 3,166,913
Patented Jan. 26, 1965

3,166,913
METHOD FOR REFRIGERATING
James M. Carter, Pasadena, Calif., assignor to Elmwood Liquid Products, Inc., New York, N.Y., a corporation of New York
Filed July 30, 1962, Ser. No. 213,525
2 Claims. (Cl. 62—56)

This invention relates to an improved method for refrigerating, employing vaporizable refrigerants.

This application is a continuation-in-part of application Serial No. 166,215, filed January 15, 1962, now abandoned.

The use of vaporizable refrigerants especially liquid nitrogen and other liquefied gases discharged as evaporated gases directly into a refrigerated area to preserve frozen and perishable foods, for example during transit, has become more widespread in recent years. Liquefied gas refrigeration or refrigeration with a solid refrigerant, such as Dry Ice (solid carbon dioxide), provides a number of advantages over refrigeration with mechanical units. It is relatively simple and the investment in a liquefied gas system is substantially less than that required for a comparable mechanical unit. The service life of the equipment is much longer and maintenance is significantly less.

A typical liquefied gas system of the type now in use includes a tank of liquefied gas, a spray header mounted adjacent the top of the space to be cooled, several intricate valves and solenoid switches, a thermostat, and necessary couplings and piping.

It is an object of this invention to provide a system and method of refrigerating with vaporizable refrigerants that reduce maintenance to the bare minimum. A still further object of the invention is to provide a self-regulating system and method of refrigeration.

Another object of the invention is to provide a refrigeration system incorporating a minimum of parts and a system which may be constructed at a reduced cost.

Another object of the invention is to provide a system and method of refrigeration which may be used either with fresh or frozen foods, including fresh and frozen meats and vegetables.

Another object of the invention is to provide a refrigeration system and method which utilize substantially the full refrigeration capacity of the vaporizable refrigerant without exposing the material being refrigerated to extremely low temperatures. A still further object of the invention is to provide a system for liquefied gas or vaporizable solid refrigeration that may be readily installed or removed from a truck body.

In the improved refrigeration method of the invention, an insulated vessel of vaporizable refrigerant is provided within the enclosed space or chamber being refrigerated. Heat flowing through the insulation of the vessel into the refrigerant causes evaporation of some of the material. The quantity of gas so evaporated is generally inadequate to provide the needed long time refrigeration, the insulation being purposely provided in an amount to insure that the normal heat flow therethrough will not be sufficient to maintain indefinitely the desired refrigeration temperature within the enclosed space. In response to a rise in temperature in the space above a predetermined value, the relatively warm atmosphere of the space is utilized to vaporize a further quantity of the refrigerant, thereby providing the needed refrigeration to lower the temperature of the space to the desired value.

The evaporated gas is preferably discharged into the atmosphere of the enclosed refrigerated space.

Preferably, the gas evaporated by the inflow of heat through the insulated vessel is removed in a line having some length (this length providing a heating segment) before the point of discharge of the gas into the atmosphere of the chamber. There occurs some indirect heating of the gas within the removal line by the relatively warm atmosphere of the space. At least a portion of the heated gas carried in the line may be returned to the insulated vessel, where it is used to heat the liquefied gas body whenever there is a rise in temperature in the space above the desired value. It will be appreciated that the heated gas so returned accelerates evaporation of the vaporizable refrigerant, thereby providing the additional refrigeration needed to lower the temperature of the space to its desired value.

These and other objects of the invention will become clear in light of the following specification and drawing wherein:

The figure is a fragmentary diagrammatic representation in cross section of an insulated enclosure equipped with a preferred embodiment of the system of the invention.

The figure shows in cross section an insulated "reefer" truck or trailer body 4 whose walls are provided with heavy insulation 6. The truck or trailer body may be of conventional design and needs no modification in preparation for installation of the system of the invention. It will be appreciated that the system of the invention may be incorporated in a nonmobile refrigeration chamber and employed there to the same advantages.

The refrigeration system of the invention which is conveniently installed at the closed end of the truck body 4 includes a vessel or tank 10 for liquefied refrigerant gas or other vaporizable refrigerant, e.g., Dry Ice. The description hereinafter will usually refer to liquefied refrigerants such as liquid nitrogen or air and the like but it will be understood that vaporizable refrigerants generally may be employed including materials such as solid carbon dioxide (Dry Ice). The vessel is provided with an insulation layer 12, the thickness of which provides an appreciable and approximately calculable heat leak. The vessel is desirably formed from metal or plastic such as polyethylene which withstands low temperatures. The normal heat inflow through the insulation 12 is inadequate to provide the gas needed to maintain the refrigerated space at its desired temperature. Gas collects in a head space 14 of the vessel 10 and is removed in a first pipe or conduit 16. The conduit 16 is purposely provided with a substantial length exposed to the atmosphere of the enclosed space, the purpose of the extended length of the pipe being to provide, in effect, a heat exchanger or heating loop segment 18. The atmosphere of the enclosed space, being at a relatively warm temperature, heats the refrigerant gas within the heating loop segment 18.

The pipe 16 beyond the heating loop segment 18 is provided with a thermostatically operated three-way valve 22. The valve 22 may be positioned to direct the heated gas from the heating loop segment 18 to a second pipe or line 23 returning from the valve to the vessel 10. The second line has a coil 23a immersed in the liquefied gas pool and extends therefrom to a point exterior of the vessel 10 where it connects into a spray header 24 provided with a plurality of outlets 25. A third line 26 extends from the valve 22 to the inlet of the spray header 24, bypassing the vessel.

A temperature sensing device 28 located in the enclosed space away from the spray header 24 is electrically, mechanically or pneumatically coupled to a solenoid 30 of the valve 22. When the temperature of the refrigerated space rises above a predetermined value, the solenoid 30 is energized and positions the valve to direct flow from the heating loop segment 18 to the second or return pipe 23. The flow of heated gas through the immersed coil 23a of the second pipe 23 increases evaporization of gas from the liquefied gas body contained within the vessel 10. When the temperature of the enclosed space as detected by the temperature sensing device 28 has dropped to the desired temperature, the solenoid is again energized and the valve positioned to direct flow from the heating loop segment 18 of the first pipe 16 to the spray header 24 via the short third line 26, thus bypassing the second pipe 23 and its immersed coil 23a. The temperature sensing device 28, if desired, may be designed to have two different actuating temperatures. For instance, the temperature at which the three-way valve 22 is actuated to direct gas flow from the heating loop segment 18 into the second pipe 23 and its immersed coil 23a may be at a temperature somewhat higher (say 38° F.) than the actuation temperature for movement of the valve to direct flow into the third line 26 which may be set, for example, at 35° F. The system of the invention may be used to refrigerate either frozen or chilled foods with the chamber being appropriately held above or below freezing.

The vessel 10 is provided with an insulated and removable closure cap 32 which threadedly engages the exterior of an upwardly extending neck 34. The vessel is filled with liquid nitrogen through the neck after removal of the closure 32.

Liquid nitrogen, liquid air, liquid carbon dioxide and similar expendable refrigerant liquids have boiling points far below the freezing points of foodstuffs. Direct contact between the refrigerant liquid and the material to be refrigerated results in extremely low temperatures and, in many instances, it is desirable to avoid such low temperatures. The process and system of the invention utilize the substantially full refrigerant capacity of the refrigerant liquid, without exposing the material to possibly harmful low temperatures which would occur if the liquid nitrogen or other liquefied gas contacted the foodstuff directly.

An appreciable fraction of the required refrigerant gas (but less than the total amount required) is produced by heat leak through the insulation into the container. That is to say, the gas evaporated from the liquefied gas pool within the container due to heat leak through the insulation is generally insufficient to provide the needed refrigeration. Various factors enter into consideration in determining the thickness of the insulation desirably used including the thermal conductivity of the insulation, the size of the enclosed space, the heat leak into the enclosed space generally experienced, the weight and specific heat of the material being refrigerated, the particular liquefied gas being used, and the desired refrigeration temperature.

The following example is an illustration of the considerations entering into the selection of the thickness of insulation to be used on a vessel in accordance with the teachings of this invention. For the purpose of illustration, it will be assumed the system is to be used in a "reefer" truck trailer which is employed to transport fresh meat held at a temperature in the range of 33–38° F. during shipment. The weight of the load is 30,000 pounds with the meat having a specific heat of 0.8 B.t.u./lb. ° F. The period for which refrigeration is required is 24 hours. The heat leak coefficient of the trailer is approximately 50 B.t.u./hr. ° F. Average ambient temperature outside the trailer is 70° F. but it may rise to 100° F. for considerable periods of time. The vaporizable refrigerant to be used is liquid nitrogen having a temperature of −320° F. The refrigeration available in liquid nitrogen, vaporized and heated to 30° F. is approximately 173 B.t.u./lb. of the liquefied gas.

The heat leak into the trailer will be:

50 B.t.u./hr. ° F. (70°−35° F.)=1750 B.t.u./hr.

The heat leak for 24 hours is:

24×1750=42,000 B.t.u.

Total liquid nitrogen to give 42,000 B.t.u. of refrigeration is:

$$\frac{42{,}000 \text{ B.t.u.}}{173 \text{ B.t.u./lb.}} = 243 \text{ lbs. or } 4.86 \text{ cubic feet}$$

A liquid nitrogen volume of 4.86 cubic feet occupies a cylindrical space of approximately 20 inches in diameter and 27 inches long, having an exterior surface of about 16.14 square feet. Using a polystyrene foam insulation with a $k$ factor (heat conductivity) of 0.15 on the liquid nitrogen vessel, the heat leak through the insulation for a refrigeration temperature of 35° F. will be:

$$\frac{dQ}{d\theta} = -kA\frac{dt}{dL}$$

where $dQ/d\theta$ (quantity per unit time) is the rate of flow of heat, A is the area at right angles to the direction in which the heat flows, and $dt/dL$ is the rate of change in temperature across the insulation in direction of heat flow, i.e., the temperature gradient. Substituting the appropriate values in the immediate foregoing equation, $$\frac{dQ}{d\theta}$$

becomes:

$$\frac{dQ}{d\theta} = -0.15 \times 16.14 \times \frac{[35-(-320)]}{L} = \frac{860}{L} \text{ B.t.u./hr.}$$

Evaporation requirement is:

$$\frac{243 \text{ lbs.}}{24 \text{ hr.}} = 10.125 \text{ lb. of liquid nitrogen per hour}$$

Liquid nitrogen absorbs 86 B.t.u./lb. during vaporization, thus the heat of evaporation per hour will be:

10.125×86=871 B.t.u./hr.

Thus, L (thickness of insulation) to provide full evaporation heat requirements therethrough would be:

$$L = \frac{860}{871} \text{ or approximately 1 inch}$$

In accordance with the invention, where it is desired to obtain heat flow through the insulation in an amount only partially sufficient to provide the required evaporated gas for refrigeration, the insulation will be made somewhat thicker, say 1.5 inches, which will give a minimum nitrogen evaporation rate of:

$$\frac{10.125}{1.5} = 6.75 \text{ lbs./hr.}$$

Maximum refrigeration required, based on a heat leak of 50 B.t.u./hr. ° F. and a temperature of 100° F. is:

50 (100−35)=3250 B.t.u./hr.

The amount of nitrogen required on an hourly basis at this higher temperature is:

$$\frac{3250}{173} = 18.79 \text{ lbs./hr.}$$

Thus, it is seen that the normal nitrogen evaporation rate will be 6.75 lbs./hr., and that additional nitrogen will be required up to the rate of 18.79 lbs./hr. (at an ambient outside temperature of 100° F.), some 12.04 lbs./hr. above the normal.

The additional liquid nitrogen evaporation (above that provided by the normal heat leak across the insulation) is provided in the preferred system of the invention by returning heated gas from the heating loop segment 18 through the valve 22 to the second line 23 and the heating coil 23a which is immersed in the liquefied gas pool. The heated gas is returned to the heating coil 23a whenever the temperature rises above a predetermined value. Thus, it is seen that the system and method of the invention are self-regulating.

It will be appreciated that the third line 26 need not be completely blocked to gas flow while the heated refrigerant gas is flowing through the second line 23 and the immersed heating coil 23a. That is to say, only a portion of the refrigerant gas from the heating loop segment 18 may be returned to the immersed coil 23a while the balance is discharged directly into the atmosphere through the spray heater 24 via the third line 26. In another embodiment, a portion of the heated gas from the heating loop segment 18 is bled continuously into the second pipe 23 and immersed coil 23a. In such an arrangement the heat flow through the insulation 12 and the heat supplied by the bleed stream must be inadequate to provide the quantity of evaporated gas normally required to provide the needed refrigeration.

Although an exemplary embodiment of the invention has been disclosed herein for purposes of illustration, it will be understood that various changes, modifications, and substitutions may be incorporated in such embodiment without departing from the spirit of the invention as defined by the claims which follow.

I claim:
1. A refrigeration method for an enclosed space comprising:
providing a pool of liquefied gas contained in an insulated vessel located in said enclosed space;
continuously discharging evaporated gas from the pool of liquefied gas contained in said insulated vessel into the enclosed space, limiting the heat passing from the atmosphere of the enclosed space through the insulated container into the liquefied gas to a value generally insufficient to provide the needed refrigeration;
passing said gas into heat exchange relation with the atmosphere in said space before discharging said gas into said atmosphere;
continuously sensing the temperature of said enclosed space;
selectively directing at least a portion of the heated gas through said vessel to indirectly heat the liquefied gas pool, in response to sensing a rise in temperature in the space above a selected value thereby accelerating evaporation of the liquefied gas and providing the needed refrigeration to lower the temperature of the space to the selected value; and
again discharging said gas directly into the space without recirculation of any significant portion thereof to the vessel, in response to sensing a temperature of said space at the selected value.
2. A refrigeration method in accordance with claim 1 wherein the liquefied gas is nitrogen.

References Cited in the file of this patent
UNITED STATES PATENTS

| | | |
|---|---|---|
| 1,895,971 | Carpenter | Jan. 31, 1933 |
| 1,908,290 | Goosman | May 9, 1933 |
| 1,926,278 | Goosman | Sept. 12, 1933 |
| 2,479,821 | Deutsch | Aug. 23, 1949 |
| 2,496,816 | Schlumbohm | Feb. 7, 1950 |
| 2,889,689 | Morrison | June 9, 1959 |
| 2,948,123 | Morrison | Aug. 9, 1960 |